United States Patent

Brink

[11] Patent Number: 5,875,881
[45] Date of Patent: Mar. 2, 1999

[54] PLOUGH SCRAPER MOUNTING ARRANGEMENT

[75] Inventor: Arend Jacobus Brink, Witbank, South Africa

[73] Assignee: Scorpio Conveyor Products (Proprietary) Limited, Witbank, South Africa

[21] Appl. No.: 110,140

[22] Filed: Jul. 6, 1998

[30] Foreign Application Priority Data

Jul. 21, 1997 [ZA] South Africa ............................ 97/6408

[51] Int. Cl.⁶ .................................................. B65G 45/16
[52] U.S. Cl. ........................................... 198/499; 198/497
[58] Field of Search ..................................... 198/497, 499

[56] References Cited

U.S. PATENT DOCUMENTS

| 1,933,485 | 10/1933 | Rund et al. | 198/499 |
| 3,865,232 | 2/1975 | Koenig et al. | 198/497 |
| 4,811,833 | 3/1989 | Slikkes | 198/499 |
| 4,944,386 | 7/1990 | Swinderman | 198/499 |
| 5,412,461 | 5/1995 | Thayes | 198/497 X |

*Primary Examiner*—James R. Bidwell
*Attorney, Agent, or Firm*—Jones, Tullar & Cooper, P.C.

[57] ABSTRACT

A plough scraper assembly for use with a conveyor belt which includes a plough scraper, first and second overhead supports which are spaced from each other in the direction of belt movement, first and second levers which are respectively pivotally attached at their upper ends to the first and second supports and, at their lower ends, to the plough scraper, the levers being inclined downwardly in the direction of belt movement, and a spring which biases the scraper towards the belt surface.

9 Claims, 2 Drawing Sheets

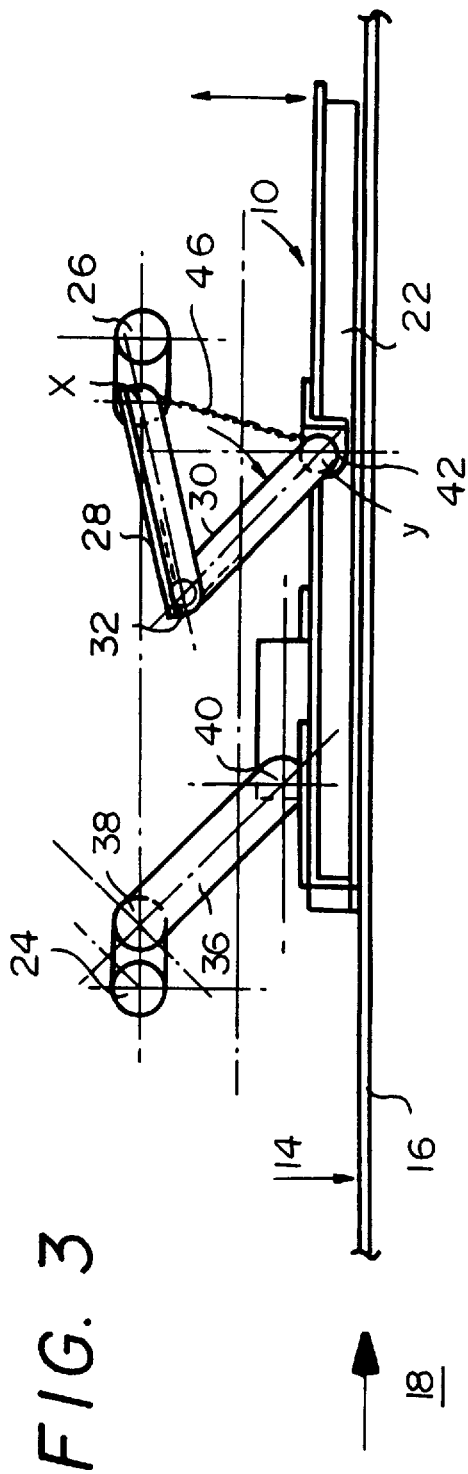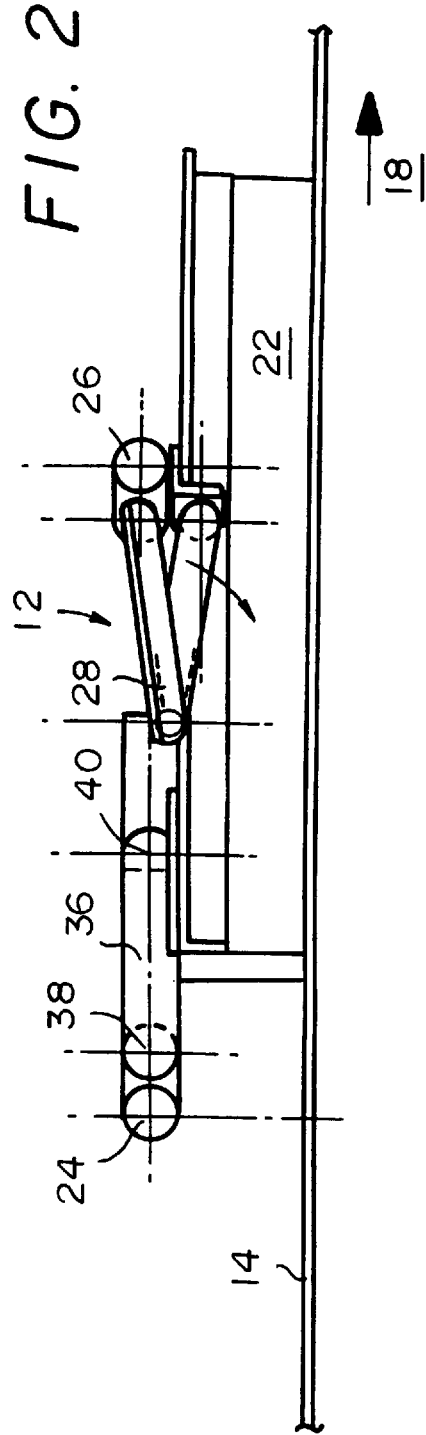

1

PLOUGH SCRAPER MOUNTING ARRANGEMENT

BACKGROUND OF THE INVENTION

This invention is concerned with a plough scraper.

A plough scraper, e.g. of a V or angle shape, is used to deflect material from an inner surface of a return strand of a conveyor belt.

This type of scraper may be mounted on levers or chains to enable the height of the scraper to fluctuate as the belt flaps or otherwise moves in a vertical direction. Substantial flapping movement of a conveyor belt can for example take place when the belt is inclined. A simple yet rather crude approach to ensure that the scraper is kept in contact with the belt is simply to apply weights to the scraper to bias it into position with the belt surface which is to be scraped. This approach however can, under certain conditions, cause the scraper to dig into the belt, an event which can lead to considerable damage.

SUMMARY OF THE INVENTION

The invention provides a mounting arrangement for a plough scraper for use with a conveyor belt which includes leading and trailing support members which are spaced from each other in the direction in which the conveyor belt extends, at least a first lever which is pivotally movable relatively to the trailing support member and which is pivotally attached to the plough scraper, means for biasing the first lever so that the plough scraper is urged towards the belt, and at least a second lever which is pivotally attached to the leading support member and to the plough scraper.

The first lever may be engaged with the plough scraper at a central location of the scraper, transversely to the direction of belt movement, when viewed in plan.

The first lever may for example be pivotally attached to the plough scraper at a first point which, viewed from the side, is on the leading side of the trailing support member e.g. between the trailing support member and the leading support member.

Any suitable biasing device may be used for urging the plough scraper towards the belt. For example use may be made of a torsion member which is made from a rubber or other resilient material, a coil spring, or the like. It is preferred that the biasing member, over the range of pivotal movement of the first lever which is possible, exerts a substantially constant biasing force.

Use may be made of two of the second levers which are connected to the plough scraper at spaced points, viewed in plan, transversely to the direction of belt movement. The second levers may be attached to the plough scraper at points which are on the trailing side of the leading support member i.e. between the leading and the trailing support members.

BRIEF DESCRIPTION OF THE DRAWINGS

The invention is further described by way of example with reference to the accompanying drawings in which:

FIG. 2 is a side view of the assembly shown in FIG. 1 with the plough scraper in a newly installed state, and FIG. 3 is a view similar to FIG. 2 but illustrating the assembly with the plough scraper in a lower position relatively to that shown in FIG. 2.

DESCRIPTION OF PREFERRED EMBODIMENT

Figure 1:
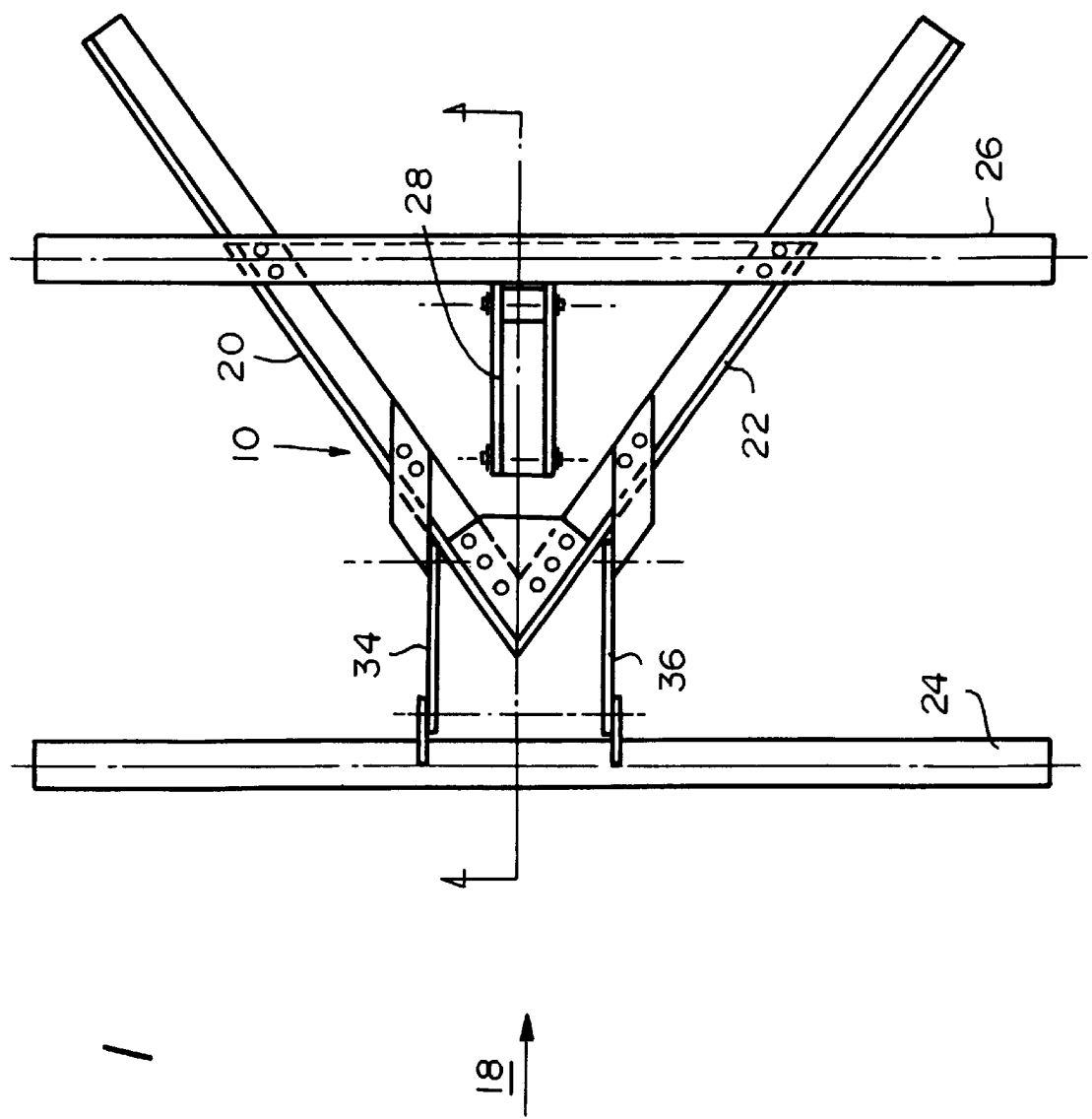
FIG. 1 is a plan view of a plough scraper which includes a mounting arrangement according to the invention.

The accompanying drawings illustrate a plough scraper assembly according to the invention which includes a V-shaped plough scraper 10 which is substantially of conventional construction and a mounting arrangement 12 which supports the scraper above a surface 14 of a conveyor belt 16 which is moving in a direction 18 relatively to the assembly.

The plough scraper 10 includes two scraping elements 20 and 22 which are arranged in a V configuration, as is shown in FIG. 1.

The mounting arrangement 12 includes a leading support member 24 and a trailing support member 26 which are positioned horizontally spaced from one another above the belt 16 and which extend transversely relatively to the direction 18. The members 24 and 26 are attached to existing conveyor support structure, not shown.

The scraper 10 is attached to the trailing support member 26 by means of two articulated levers 28 and 30. A coil spring 32 acts between the levers 28 and 30 and biases the lever 30 downwardly so that the scraper 10 is urged towards the surface 14.

The leading support member 24 has two transversely spaced levers 34 and 36 respectively which are pivotally attached to the support 24 for movement about an axis 38 and, at lower ends, to the scraper 10 for movement about an axis 40.

The axis 40 is on the trailing side of the leading support member and is positioned between the support members 24 and 26.

The lever 30 is attached to the plough scraper 10 at a pivot point 42 which is on the leading side of the trailing support member 26 and is positioned between the support members 24 and 26, when viewed from the side.

As is evident more particularly from FIG. 1 the plough scraper is thus suspended from the support members 24 and 26 at three spaced pivot points. The levers 34 and 36 can move independently, to a limited extent, from each other and consequently the scraper 10 is able to tilt laterally relatively to the direction 18 and, viewed from the side, can vary its inclination relatively to the belt 16. The scraper can also move vertically up and down relatively to the belt.

The biasing force which is exerted by the spring 32 is applied at an intermediate position to the plough scraper. The leading pointed end of the scraper on the other hand, subject to any restraining action exerted by the levers 34 and 36, is able to float. Due to gravity action and due to the biasing force of the spring 32 the scraper 10 is urged into scraping contact with the surface 14.

The mounting arrangement which has been described has been found to be particularly effective in maintaining the scraper in contact with the surface 14 while simultaneously permitting the scraper to move as the belt 16 moves vertically up and down. Due to the fact that the axis 40 trails the axis 38 any tendency of the scraper to dig into the surface 14, as the belt 16 moves in a vertical direction, is reduced. On the other hand firm scraping engagement of the scraping elements 22 and 20 with the surface 14 is maintained by means of the spring 32.

It is desirable to make use of a biasing component which acts between the levers 28 and 30 which is able to exert a substantially constant biasing force over the required extent of movement of the lever 30 relatively to the lever 28. A multi turn coil spring 32 is particularly suitable for this purpose although other devices such as rubber or similar elastomeric torsion elements can be used in place of or in addition to the spring.

FIG. 2 illustrates the assembly with the belt 16 in an uppermost position and relatively close to the support members 24 and 26. FIG. 3 on the other hand illustrates the belt 16 displaced from the support members. The mounting arrangement will take on an orientation similar to that shown in FIG. 3 when the belt 16 moves downwardly relatively to the support members 24 and 26 or when the scraping elements 20 and 22 are substantially worn.

As the elements 20 and 22, which are made for example from polyurethane, wear, metal parts of the scraper descend to a position which is closer to the belt, as shown in FIG. 3. To prevent the metal parts from contacting, and possibly damaging the conveyor belt a restraining device such as a chain or rod 46 is connected between the pivot points X and Y, shown in FIG. 3. This device will stop the elements from descending further and the scraper will only move laterally, from time to time, due to its contact with the conveyor belt. The restraining device is preferably adjustable in length to permit the maximum spacing between the points X and Y to be set.

What is claimed is:

1. A mounting arrangement for a plough scraper for use with a conveyor belt which includes leading and trailing support members which are spaced from each other in the direction in which the conveyor belts extends, at least a first lever which is pivotally movable relatively to the trailing support member and which is pivotally attached to the plough scraper, means for biasing the first lever so that the plough scraper is urged towards the belt, and at least a second lever which is pivotally attached to the leading support member and to the plough scraper.

2. A mounting arrangement according to claim 1 wherein the first lever is engaged with the plough scraper at a central location of the scraper, transversely to the direction of belt movement, when viewed in plan.

3. A mounting arrangement according to claim 1 wherein the first lever is pivotally attached to the plough scraper at a first point which, viewed from the side, is between the trailing support member and the leading support member.

4. A mounting arrangement according to claim 1 wherein the biasing member is a coil spring.

5. A mounting arrangement according to claim 1 which includes two of the second levers which are connected to the plough scraper at spaced points, viewed in plan, transversely to the direction of belt movement.

6. A mounting arrangement according to claim 5 wherein the second levers are connected to the plough scraper at points which are between the leading and the trailing support members.

7. A mounting arrangement according to claim 1 which includes means for limiting the degree of movement of the plough scraper, downwards, relatively to the leading and trailing support members.

8. A plough scraper assembly for use with a conveyor belt which includes a plough scraper, first and second overhead supports which are spaced from each other in the direction of belt movement, first and second levers which are respectively pivotally attached at their upper ends to the first and second supports and, at their lower ends, to the plough scraper, the levers being inclined downwardly in the direction of belt movement, and means biasing the plough scraper towards the belt.

9. A plough scraper assembly according to claim 8 wherein the biasing means acts between the first support and the plough scraper, the first support trailing the second support in the direction of belt movement, and the first support including a member which is pivotally attached to fixed structure and to the said upper end of the first lever.

* * * * *